(12) United States Patent
Kanikanti et al.

(10) Patent No.: US 12,502,390 B2
(45) Date of Patent: Dec. 23, 2025

(54) COMPOSITIONS COMPRISING TIGOLANER FOR CONTROLLING PARASITES

(71) Applicant: VETOQUINOL SA, Magny-Vernois (FR)

(72) Inventors: Venkata-Rangarao Kanikanti, Gudivada (IN); Iris Heep, Cologne (DE); Elisabeth Feldhues, Bergisch Gladbach (DE); David Siegel, Langenfeld (DE); Gabriele Petry, Krefeld (DE)

(73) Assignee: VETOQUINOL SA, Magny-Vernois (FR)

( * ) Notice: Subject to any disclaimer, the term of this patent is extended or adjusted under 35 U.S.C. 154(b) by 872 days.

(21) Appl. No.: 17/635,289

(22) PCT Filed: Aug. 12, 2020

(86) PCT No.: PCT/EP2020/072640
§ 371 (c)(1),
(2) Date: Feb. 14, 2022

(87) PCT Pub. No.: WO2021/028479
PCT Pub. Date: Feb. 18, 2021

(65) Prior Publication Data
US 2022/0331314 A1    Oct. 20, 2022

(30) Foreign Application Priority Data

Aug. 14, 2019 (EP) .................................. 19191727

(51) Int. Cl.
| | | |
|---|---|---|
| *A61K 31/4985* | (2006.01) | |
| *A61K 9/00* | (2006.01) | |
| *A61K 31/4155* | (2006.01) | |
| *A61K 47/22* | (2006.01) | |
| *A61P 33/14* | (2006.01) | |

(52) U.S. Cl.
CPC ........ *A61K 31/4985* (2013.01); *A61K 9/0017* (2013.01); *A61K 31/4155* (2013.01); *A61K 47/22* (2013.01); *A61P 33/14* (2018.01)

(58) Field of Classification Search
CPC .................................................. A61K 31/4985
See application file for complete search history.

(56) References Cited

U.S. PATENT DOCUMENTS

| | | | |
|---|---|---|---|
| 2003/0125244 A1 | 7/2003 | Kalbe et al. | |
| 2005/0255037 A1 | 11/2005 | Otsuka et al. | |
| 2008/0255037 A1* | 10/2008 | Kanikanti .............. | A61P 33/10 514/1.1 |

FOREIGN PATENT DOCUMENTS

| | | | | |
|---|---|---|---|---|
| CN | 101193657 A | 6/2008 | | |
| CN | 108883092 A | 11/2018 | | |
| EP | 0662326 A2 | 7/1995 | | |
| JP | 2006520346 A | 9/2006 | | |
| JP | 2017036332 A | 2/2017 | | |
| JP | 2019094270 A | 6/2019 | | |
| WO | 9319053 A1 | 9/1993 | | |
| WO | 2005105034 A1 | 11/2005 | | |
| WO | 2008080542 A2 | 7/2008 | | |
| WO | 2014012975 A1 | 1/2014 | | |
| WO | WO2014122083 * | 1/2014 | ......... | C07D 401/112 |
| WO | 2014122083 A1 | 8/2014 | | |
| WO | 2015078846 A1 | 6/2015 | | |
| WO | 2015078847 A1 | 6/2015 | | |
| WO | 2015150302 A1 | 10/2015 | | |
| WO | 2015181139 A1 | 12/2015 | | |
| WO | 2016026789 A1 | 2/2016 | | |
| WO | 2016174049 A1 | 11/2016 | | |
| WO | 2016177619 A1 | 11/2016 | | |
| WO | WO-2019048381 A1 * | 3/2019 | ............. | A01N 25/02 |
| WO | 2021028479 A1 | 2/2021 | | |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources > Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Foreign Communication from a Related Counterpart Application, International Search Report and Written Opinion dated Oct. 22, 2020, International Application No. PCT/EP2020/072640 filed on Aug. 12, 2020.
WHO Drug Information, vol. 31, No. 2, 2017, p. 341.
Foreign Communication from a Related Counterpart Application, Chinese Exam Report dated Oct. 11, 2023, Chinese Application No. 202080057562.3 filed on Aug. 12, 2020.
Guidance for Industry, "Codevelopment of Two or More New Investigational Drugs for Use in Combination" U.S. Department of Health and Human Services, Food and Drug Administration, Center for Drug Evaluation and Research (CDER), Jun. 2013.

* cited by examiner

*Primary Examiner* — Nizal S Chandrakumar
(74) *Attorney, Agent, or Firm* — Conley Rose, P.C.

(57) ABSTRACT

The present invention relates to a composition comprising tigolaner and, optionally endoparasiticidal agents, a method for its manufacture and its use as a medicament for controlling parasites. Compositions can include tigolaner and 1,2-isopropylideneglycerol, or the composition can include praziquantel, emodepside a solvent component, and tigolaner. The composition can be used in the treatment and/or prevention of parasite infections in animals.

10 Claims, No Drawings

COMPOSITIONS COMPRISING TIGOLANER FOR CONTROLLING PARASITES

CROSS-REFERENCE TO RELATED APPLICATIONS

The present application is a filing under 35 U.S.C. 371 as the National Stage of International Application No. PCT/EP2020/072640, filed Aug. 12, 2020, entitled "COMPOSITIONS COMPRISING TIGOLANER FOR CONTROLLING PARASITES," which claims priority to European Application No. 19191727.7 filed with the European Patent Office on Aug. 14, 2019, both of which are incorporated herein by reference in their entirety for all purposes.

The present invention relates to a composition comprising tigolaner and, optionally endoparasiticidal agents, a method for its manufacture and its use as a medicament for controlling parasites.

Formulations for controlling ectoparasites in pets such as cats can be administered in so-called spot-on formulations. Spot-on treatment can be packaged in individual doses of liquid and is usually applied by pouring the liquid onto the back of the pet, for example between the shoulders. From there, the active agent is absorbed into the pet's system and/or distributed over the pet's skin and can act accordingly.

WO 2008/080542 A2 discloses a composition for controlling parasites on animals, comprising fipronil, flumethrin, an aliphatic cyclic carbonate and an aliphatic cyclic or acyclic polyether. WO 2005/105034 A1 is directed towards a composition of matter, comprising: a) 0.1-60% by weight of an active pyrethroid compound; b) 7.5-30.0% by weight of dinotefuran and/or dinotefuran analogues; c) 27.5-62.5% by weight of organic solvents from the class of the methylpyrrolidones, aliphatic alcohols and cyclic carbonates, aliphatic, cyclic or acyclic ethers and mixtures of these; d) 0-5% by weight of water; e) 0-0.5% by weight of phenolic antioxidants; and g) 0-0.5% by weight of organic acids.

Emodepside (cyclo[(R)-lactoyl-N-methyl-L-leucyl-(R)-3-(p-morpholinophenyl) lactoyl-N-methyl-L-leucyl-(R)-lactoyl-N-methyl-L-leucyl-(R)-3-(p-morpholinopheny-lactoyl-N-methyl-L-leucyl) is an anthelmintic drug that is effective against a number of gastrointestinal nematodes. Its molecular structure which is depicted below can be described as a cyclic octadepsipeptides, a depsipeptide being a peptide in which one or more of its amide groups are replaced by the corresponding ester groups. On a technical scale emodepside may be obtained by derivatization of the naturally occurring substance PF1022Ain which two hydrogen atoms are exchanged for morpholine rings.

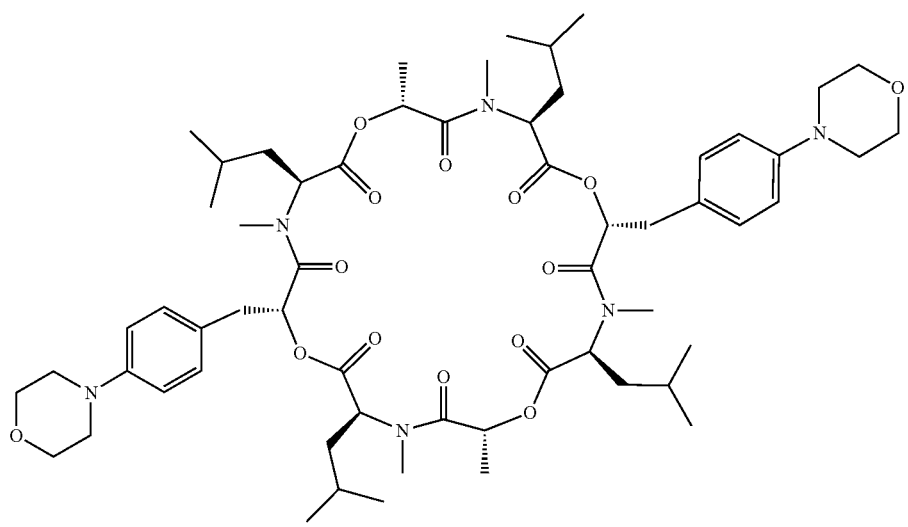

(Emodepside)

WO 93/19053 A1 (EP 0 634 408 A1) discloses a compound of the general formula:

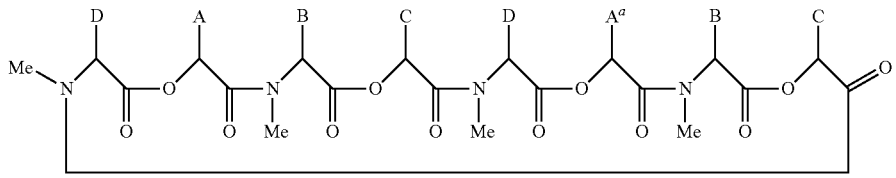

wherein A is benzyl group which has suitable substituent(s) or phenyl group which may have suitable substituent(s), $A^a$ is benzyl group which may have suitable substituent(s) or phenyl group which may have suitable substituent(s), B and D are each lower alkyl, C is hydrogen or lower alkyl, and a pharmaceutically acceptable salt thereof.

EP 0 662 326 A2 concerns the use of praziquantel and epsiprantel for enhancing the endoparasiticidal activity of cyclic depsipeptides in endoparasiticidal compositions.

US 2003/125244 A1 relates to transdermally administrable compositions comprising cyclic depsipeptides, to their preparation and to their use for controlling endoparasites. In the compositions according this patent application the active compounds can also be present in a mixture with synergists or other compounds which are active against pathogenic endoparasites. Examples given for such active compounds are L-2,3,5,6-tetra-hydro-6-phenylimidazothiazol, benzimidazol carbamates, such as febantel, furthermore pyrantel, praziquantel and ivermectin.

US 2008/255037 A1 relates to compositions for external application which comprise emodepside and praziquantel or epsiprantel and 1,2-isopropylideneglycerol, to their preparation and to their use for controlling endoparasites.

Praziquantel and epsiprantel have the following structures:

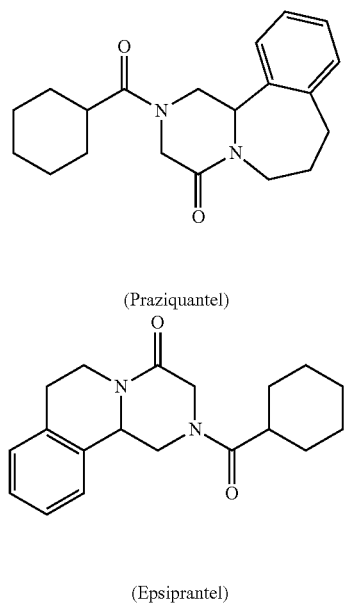

(Praziquantel)

(Epsiprantel)

Anthelmintic products for animals under the name Profender® are available on the market. These include the Profender® spot-on solution for cats which contains emodepside and praziquantel as active ingredients and butylhydroxyanisole, isopropylideneglycerol and lactic acid as excipients.

Tigolaner (WHO Drug Information, Vol. 31, No. 2, 2017, page 341) is an antiparasitic agent for veterinary use with the following structure:

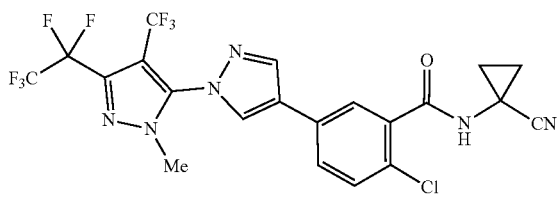

Tigolaner is described in structure Ic-2, table 3 of WO 2014/122083 A1. By way of example, tigolaner is also mentioned in example 3 (page 39) of WO 2016/177619 A1. International patent applications relating to the synthesis of such compounds are, for example: WO 2014/012975 A1, WO 2015/078846 A1, WO 2015/078847 A1, WO 2015/150302 A1, WO 2015/181139 A1 and WO 2016/026789 A1.

Because of the wide variety of requirements to be met by modern pharmaceuticals, for example concerning level of activity (for example plasma concentration of the active compound), duration of action, spectrum of action, range of applications, toxicity, combination of active compounds, combination with formulation auxiliaries, and because of the possible occurrence of resistance, the development of novel pharmaceuticals cannot ever be regarded as complete, and there is a continuing great need for novel compositions which have advantages, at least in some aspects, over the known compositions.

To enable the pet owner to apply parasiticidally active compounds in a manner which is as simple as possible, it is furthermore desirable to provide an externally applicable composition, external application in the context of the present application generally meaning application to the skin or the coat of animals.

Such compositions need to meet additional criteria, e.g.:
efficacy (particularly where an active compounds acts systemically)
target animal safety, user safety
well tolerated
convenience The present invention is directed towards a composition according to a first aspect and in a further embodiment to a composition according to a second aspect, a method according to a third aspect, a composition for use as a medicament according to a fourth aspect, and a composition for use in the treatment and/or prevention of parasite infections in animals according to a fifth aspect. Advantageous embodiments are the subject of the additional aspects. They may be combined freely unless the context clearly indicates otherwise.

Accordingly one embodiment of the present invention is a composition comprising tigolaner and 1,2-isopropylideneglycerol. The composition may preferably comprise tigolaner in amounts of ≥1 weight-% to ≤15 weight-%; according to further preferred embodiments the composition may contain tigolaner in amounts of ≥1 weight-% to ≤11 weight-% or ≥7 weight-% to ≤11 weight-% or ≥1 weight-% to ≤9.5 weight-% or ≥7 weight-% to ≤9.5 weight-%). The composition optionally further comprises praziquantel, preferably in concentrations ≥1 weight-% to ≤15 weight-% (preferably ≥6 weight-% to ≤9 weight-%). In compositions according to the invention that contain tigolaner and solketal but do not contain praziquantel, the amount of tigolaner is preferably <10 weight-%, more preferably <9.5 weight-%.

According to a further embodiment, the present invention comprises a composition comprising praziquantel, emodepside and a solvent component further comprises tigolaner. These substances have the structures already defined in the preceding section. The composition according to this embodiment expands the endoparasiticidal action of praziquantel and emodepside with the ectoparasiticidal action of tigolaner. In particular, cestodes, trematodes, nematodes, acantocephales fleas and ticks can be controlled.

Unless otherwise specified, the solvent component preferably contains solvents suitable for a trans dermal application of the active pharmaceutical ingredients such as DMSO, NMP, 2-pyrrolidone, dimethylacetamide (DMAc), glycerine formal (also referred to as glycerol formal), tetraglycol, triethylphosphate, propylene carbonate or 1,2-isopropylideneglycerol (also known as solketal).

By controlling the pathogenic endoparasites, it is intended to reduce disease, mortality and decreasing performance (for example in the production of meat, milk, wool, hides, eggs, honey, etc), so that more economical and simpler animal keeping is possible by using the active compounds. The pathogenic endoparasites include cestodes, trematodes, nematodes and acantocephales:

Praziquantel controls especially the following endoparasites:

from the order of the Pseudophyllidea, for example: *Diphyllobothrium* spp., *Spirometra* spp., *Schistocephalus* spp., *Ligula* spp., *Bothridium* spp., *Diphlogonoporus* spp.

from the order of the Cyclophyllidea, for example: *Mesocestoides* spp., *Anoplocephala* spp., *Paranoplocephala* spp., *Moniezia* spp., *Thysanosomsa* spp., *Thysaniezia* spp., *Avitellina* spp., *Stilesia* spp., *Cittotaenia* spp., *Andyra* spp., *Bertiella* spp., *Taenia* spp., *Echinococcus* spp., *Hydatigera* spp., *Davainea* spp., *Raillietina* spp., *Hymenolepis* spp., *Echinolepis* spp., *Echinocotyle* spp., *Diorchis* spp., *Dipylidium* spp., *Joyeuxiella* spp., *Diplopylidium* spp.

from the subclass of the Monogenea, for example: *Gyrodactylus* spp., *Dactylogyrus* spp., *Polystoma* spp.

from the subclass of the Digenea, for example: *Diplostomum* spp., *Posthodiplostomum* spp., *Schistosoma* spp., *Trichobilharzia* spp., *Ornithobilharzia* spp., *Austrobilharzia* spp., *Gigantobilharzia* spp., *Leucochloridium* spp., *Brachylaima* spp., *Echinostoma* spp., *Echinoparyphium* spp., *Echinochasmus* spp., *Hypoderaeum* spp., *Fasciola* spp., *Fasciolides* spp., *Fasciolopsis* spp., *Cyclocoelum* spp., *Typhlocoelum* spp., *Paramphistomum* spp., *Calicophoron* spp., *Cotylophoron* spp., *Gigantocotyle* spp., *Fischoederius* spp., *Gastrothylacus* spp., *Notocotylus* spp., *Catatropis* spp., *Plagiorchis* spp., *Prosthogonimus* spp., *Dicrocoelium* spp., *Eurytrema* spp., *Troglotrema* spp., *Paragonimus* spp., *Collyriclum* spp., *Nanophyetus* spp., *Opisthorchis* spp., *Clonorchis* spp. *Metorchis* spp., *Heterophyes* spp., *Metagonimus* spp.

Emodepside controls especially the following endoparasites:

from the order of the Enoplida, for example: *Trichuris* spp., *Capillaria* spp., *Trichomosoides* spp., *Trichinella* spp.

from the order of the Rhabditia, for example: *Micronema* spp., *Strongyloides* spp., *Aelurostrongylus* spp., *Troglostrongylus brevior* from the order of the Strongylida, for example: *Stronylus* spp., *Triodontophorus* spp., *Oesophagodontus* spp., *Trichonema* spp., *Gyalocephalus* spp., *Cylindropharynx* spp., *Poteriostomum* spp., *Cyclococercus* spp., *Cylicostephanus* spp., *Oesophagostomum* spp., *Chabertia* spp., *Stephanurus* spp., *Ancylostoma* spp., *Uncinaria* spp., *Bunostomum* spp. *Globocephalus* spp., *Syngamus* spp., *Cyathostoma* spp., *Metastrongylus* spp., *Dictyocaulus* spp., *Muellerius* spp., *Protostrongylus* spp., *Neostrongylus* spp., *Cystocaulus* spp., *Pneumostrongylus* spp., *Spicocaulus* spp., *Elaphostrongylus* spp. *Parelaphostrongylus* spp., *Crenosoma* spp., *Paracrenosoma* spp., *Angiostrongylus* spp., *Aelurostrongylus* spp., *Filaroides* spp., *Parafilaroides* spp., *Trichostrongylus* spp., *Haemonchus* spp., *Ostertagia* spp., *Marshallagia* spp., *Cooperia* spp., *Nematodirus* spp., *Hyostrongylus* spp., *Obeliscoides* spp., *Amidostomum* spp., *Ollulanus* spp.

from the order of the Oxyurida, for example: *Oxyuris* spp., *Enterobius* spp., *Passalurus* spp., *Syphacia* spp., *Aspiculuris* spp., *Heterakis* spp.

from the order of the Ascaridia, for example: *Ascaris* spp., *Toxascads* spp., *Toxocara* spp., *Parascaris* spp., *Anisakis* spp., *Ascaridia* spp.

from the order of the Spirurida, for example: *Gnathostoma* spp., *Physaloptera* spp., *Thelazia* spp., *Gongylonema* spp., *Habronema* spp., *Parabronema* spp., *Draschia* spp., *Dracunculus* spp.

from the order of the Filariida, for example: *Stephanofilaria* spp., *Parafilaria* spp., *Setaria* spp., *Loa* spp., *Dirofilaria* spp., *Litomosoides* spp., *Brugia* spp., *Wuchereria* spp., *Onchocerca* spp.

from the order of the Gigantorhynchida, for example: *Filicollis* spp., *Moniliformis* spp., *Macracanthorhynchus* spp., *Prosthenorchis* spp.

Pests targeted by tigolaner include:

from the order of the Anoplura, for example, *Haematopinus* spp., *Linognathus* spp., *Solenopotes* spp., *Pediculus* spp., *Pthirus* spp.;

from the order of the Mallophaga, for example, *Trimenopon* spp., *Menopon* spp., *Eomena-canthus* spp., *Menacanthus* spp., *Trichodectes* spp., *Felicola* spp., *Damalinea* spp., *Bovicola* spp.;

from the order of the Diptera, suborder Brachycera, for example, *Chrysops* spp., *Tabanus* spp., *Musca* spp., *Hydrotaea* spp., *Muscina* spp., *Haematobosca* spp., *Haematobia* spp., *Stomoxys* spp., *Fannia* spp., *Glossina* spp., *Lucilia* spp., *Calliphora* spp., *Auchmeromyia* spp., *Cordylobia* spp., *Cochliomyia* spp., *Chrysomyia* spp., *Sarcophaga* spp., *Wohlfartia* spp., *Gasterophilus* spp., *Oesteromyia* spp., *Oedemagena* spp., *Hypoderma* spp., *Oestrus* spp., *Rhinoestrus* spp., *Melophagus* spp., *Hippobosca* spp.;

from the order of the Diptera, suborder Nematocera, for example, *Culex* spp., *Aedes* spp., *Anopheles* spp., *Culicoides* spp., *Phlebotomus* spp., *Simulium* spp.

from the order of the Siphonaptera, for example, *Ctenocephalides* spp., *Echidnophaga* spp., *Ceratophyllus* spp., *Pulex* spp.

from the order of the Metastigmata, for example, *Hyalomma* spp., *Rhipicephalus* spp., *Boophilus* spp., *Amblyomma* spp., *Haemaphysalis* spp., *Dermacentor* spp., *Ixodes* spp., *Argas* spp., *Ornithodorus* spp., *Otobius* spp.;

from the order of the Mesostigmata, for example, *Dermanyssus* spp., *Ornithonyssus* spp., *Pneumonyssus* spp.

from the order of the Prostigmata, for example, *Cheyletiella* spp., *Psorergates* spp., *Myobia* spp., *Demodex* spp., *Neotrombicula* spp.;

from the order of the Astigmata, for example, *Acarus* spp., *Myocoptes* spp., *Psoroptes* spp., *Chorioptes* spp., *Otodectes* spp., *Sarcoptes* spp., *Notoedres* spp., *Knemidocoptes* spp., *Neoknemidocoptes* spp., *Cytodites* spp., *Laminosioptes* spp.

Particular emphasis may be given to the action against fleas (Siphonaptera, for example, *Ctenocephalides* spp., *Echidnophaga* spp., *Ceratophyllus* spp., *Pulex* spp.), ticks (*Hyalomma* spp., *Rhipicephalus* spp., *Boophilus* spp., *Amblyomma* spp., *Haemaphysalis* spp., *Dermacentor* spp., *Ixodes* spp., *Argas* spp., *Ornithodorus* spp., *Otobius* spp.) and the Diptera mentioned above (*Chrysops* spp., *Tabanus* spp., *Musca* spp., *Hydrotaea* spp., *Muscina* spp., *Haematobosca* spp., *Haematobia* spp., *Stomoxys* spp., *Fannia* spp., *Glossina* spp., *Lucilia* spp., *Calliphora* spp., *Auchmeromyia* spp., *Cordylobia* spp., *Cochliomyia* spp., *Chrysomyia* spp.,

*Sarcophaga* spp., *Wohlfartia* spp., *Gasterophilus* spp., *Oesteromyia* spp., *Oedemagena* spp., *Hypoderma* spp., *Oestrus* spp., *Rhinoestrus* spp., *Melophagus* spp., *Hippobosca* spp.).

In one embodiment of the composition the solvent component comprises 1,2-isopropylideneglycerol and the water content of the composition is at most 5% by weight, preferably at most 3% by weight, more preferably at most 2% by weight, even more preferably at most 1.5% by weight, in particular at most 1% by weight.

In another embodiment of the composition the solvent component comprises only 1,2-isopropylideneglycerol. The solubility of tigolaner in solketal alone has been determined to be in the range of ca 9.5-9.9% w/w. Surprisingly it has been found that it could be increased to at more than 10.5% w/w in solketal in the presence of praziquantel, in particular of 7.5 to 8.5% w/w of praziquantel.

In another embodiment the composition comprises:
≥1 weight-% to ≤15 weight-% (preferably ≥6 weight-% to ≤9 weight-%) praziquantel;
≥1 weight-% to ≤10 weight-% (preferably ≥1.2 weight-% to ≤3 weight-%) emodepside;
≥1 weight-% to ≤15 weight-% (preferably ≥7 weight-% to ≤11 weight-%) tigolaner;
wherein the weight-percentages are based on the total weight of the composition.

Preferably the composition comprises:
≥1 weight-% to ≤15 weight-% (preferably ≥6 weight-% to ≤9 weight-%) praziquantel;
≥1 weight-% to ≤10 weight-% (preferably ≥1.2 weight-% to ≤3 weight-%) emodepside;
≥1 weight-% to ≤15 weight-% (preferably ≥7 weight-% to ≤11 weight-%) tigolaner
≥0 weight-% to ≤5 weight-% (preferably ≥1 weight-% to ≤3 weight-%) of other components excluding solvents;
wherein the weight-percentages are based on the total weight of the composition and the balance to 100 weight % is constituted by 1,2-isopropylideneglycerol as the solvent component.

In another embodiment the composition further comprises an anti-oxidant. These anti-oxidants can in particular protect praziquantel and/or emodepside against oxidation.

In another embodiment the anti-oxidant is butyl hydroxyanisole (BHA) and/or butyl hydroxytoluene (BHT). Preferably the present compositions contain BHT. According to another preferred embodiment the present compositions contain BHA and BHT.

In another embodiment the composition further comprises an acid. These acids are preferably carboxylic acids. They can act as a stabilizer.

In another embodiment the acid is lactic acid.
In another embodiment the composition comprises:
≥1 weight-% to ≤15 weight-% (preferably ≥6 weight-% to ≤9 weight-%) praziquantel;
≥1 weight-% to ≤10 weight-% (preferably ≥1.2 weight-% to ≤3 weight-%) emodepside;
≥1 weight-% to ≤15 weight-% (preferably ≥7 weight-% to ≤11 weight-%) tigolaner;
≥0.01 weight-% to ≤1 weight-% (preferably ≥0.1 weight-% to ≤0.5 weight-%) butyl hydroxyanisole (BHA) and/or butyl hydroxytoluene (BHT);
≥1 weight-% to ≤5 weight-% (preferably ≥1.5 weight-% to ≤2.5 weight-%) lactic acid;
wherein the weight-percentages are based on the total weight of the composition.

Preferably the composition comprises:
≥1 weight-% to ≤15 weight-% (preferably ≥6 weight-% to ≤9 weight-%) praziquantel;
≥1 weight-% to ≤10 weight-% (preferably ≥1.2 weight-% to ≤3 weight-%) emodepside;
≥1 weight-% to ≤15 weight-% (preferably ≥7 weight-% to ≤11 weight-%) tigolaner;
≥0.01 weight-% to ≤1 weight-% (preferably ≥0.1 weight-% to ≤0.5 weight-%) butyl hydroxyanisole (BHA) and/or butyl hydroxytoluene (BHT);
≥1 weight-% to ≤5 weight-% (preferably ≥1.5 weight-% to ≤2.5 weight-%) lactic acid;
wherein the weight-percentages are based on the total weight of the composition and the balance to 100 weight % is constituted by 1,2-isopropylideneglycerol as the solvent component.

The presence of lactic acid slightly lowers the solubility of tigolaner in 1,2-isopropylideneglycerol It is therefore preferred to use low concentrations of lactic acid in compositions that contain tigolaner and 1,2-isopropylideneglycerol, namely
≥1 weight-% to ≤3 weight-% (preferably ≥1 weight-% to ≤2.5 weight-%) lactic acid.

The invention is also directed towards a method for producing a composition according to the invention, comprising the step of dissolving the active ingredient or active ingredients as well as optional further ingredients in a solvent component. According to one embodiment this method comprsises the step of dissolving praziquantel, emodepside and tigolaner in a solvent component.

The compositions are prepared by mixing appropriate amounts of the components in suitable vessels; preferably, the components are mixed until a clear solution is formed.

According to one embodiment, in compositions containing emodepside and tigolaner, emodepside can be added before tigolaner to facilitate the dissolution of tigolaner.

According to a further embodiment, in compositions containing praziquantel, emodepside and tigolaner, praziquantel and emodepside can be added before tigolaner to facilitate the dissolution of tigolaner.

To speed up dissolution kinetics, the mixture can be warmed and/or shear force can be applied.

The preparation of the present compositions can be conducted under inert gas, preferably dry inert gas, for example by blanketing with Nitrogen or Argon. "Dry" inert gas preferably means that the gas contains less than 100 ppm (per volume) water.

In general, it has been found to be advantageous to meter compositions according to the invention such that per application from about 1 to about 100 mg of the active compound in question are administered per kg of body weight. Preferred in the case of emodepside are from 1 to 20 mg, in particular from 1 to 10 mg, of active compound per kg of body weight; in the case of praziquantel from 5 to 50 mg, in particular from 5 to 20 mg, of active compound per kg of body weight; and in the case of tigolaner 5 to 30 mg, in particular 10 to 20 mg per kg of body weight.

A further aspect of the invention is a composition according to the invention for use as a medicament.

Without being bound to any theory it is believed that Tigolaner mainly acts systemically, i.e. it penetrates through the skin and enters the blood circulation. Since Emodepside and praziquantel act against endoparasites it is believed that they also act systemically.

Application can take place both prophylactically and therapeutically.

Preferably, the compositions according to the invention are suitable for spot-on, pour-on or spray application, where the spray application may be carried out, for example, using a pump spray or an aerosol spray (pressurized spray). For specific indications, the formulations may also be used after dilution with water as a dip; in this case, the formulation should contain emulsifying additives.

The preferred application forms are pump spray, pour-on and spot-on. The spot-on application is very particularly preferred.

The invention also encompasses a composition according to the invention for use in the treatment and/or prevention of parasite infections in animals.

Animals are preferably mammals such as for example cats, dogs or ferrets.

In one embodiment the animals are cats.

In another embodiment the parasites are endoparasites and ectoparasites.

In another embodiment the parasites are selected from the group consisting of:

Endoparasites selected from: *Toxocara cati, Toxascaris leonina, Ancylostoma tubaeforme, Uncinaria stenocephala, Dipylidiun caninum, Taenia taeniaeformis, Echinococcus multiocularis; Aelurostrongylus abstrusus*, and *Troglostrongylus* spp.;

Ectoparasites selected from: *Ctenocephalides* spp., *Echidnophaga* spp., *Cteratophyllus* spp., *Pulex* spp., *Hyalomma* spp., *Rhipicephalus* spp., *Boophilus* spp., *Amblyomma* spp., *Haemaphysalis* spp., *Dermacentor* spp., *Ixodes* spp., *Argas* spp., *Ornithodorus* spp., *Otobius* spp., *Otodectes cynotis, Notoedres cati*, and combinations thereof.

Tigolaner shows long-term efficacy. The present compositions may therefore be applied to the host animal in intervals of 4 weeks or more, preferably 8 weeks or more, more preferably 10 weeks or more, in particular 12 weeks or more.

EXAMPLES

The present invention will be further described in the following examples without wishing to be limited by them. Solketal is 1,2-isopropylideneglycerol. All examples shown include Solketal that already contains 0.3% BHA for general stability of the solvent.

Examples were prepared by mixing the ingredients using a stirrer. In compositions containing praziquantel and tigolaner, praziquantel was added first to facilitate the dissolution of tigolaner. In compositions containing emodepside and tigolaner, a preferred option is that emodepside is added first to facilitate the dissolution of Tigolaner. In compositions containing praziquantel, emodepside and tigolaner, the preferred option is that praziquantel and emodepside are added first to facilitate the dissolution of Tigolaner. All examples are homogeneous solutions.

Example 1

| Ingredient | % w/w |
| --- | --- |
| Tigolaner | 9.7 |
| Solketal | to 100.0 |

Example 2

| Ingredient | % w/w |
| --- | --- |
| Tigolaner | 10.7 |
| Praziquantel | 7.4 |
| Solketal | to 100.0 |

Example 3

| Ingredient | % w/w |
| --- | --- |
| Tigolaner | 11.0 |
| Praziquantel | 7.4 |
| Emodepside | 1.7 |
| Solketal | to 100.0 |

Example 4

| Ingredient | % w/w |
| --- | --- |
| Tigolaner | 8.9 |
| Praziquantel | 7.4 |
| Emodepside | 1.85 |
| Milchsäure | 2.0 |
| BHT | 0.1 |
| Solketal | to 100.0 |

Example 5

| Ingredient | % w/w |
| --- | --- |
| Tigolaner | 8.9 |
| Praziquantel | 7.4 |
| Emodepside | 1.85 |
| Milchsäure | 2.0 |
| BHT | 0.2 |
| Solketal | to 100.0 |

Example 6

| Ingredient | % w/w |
| --- | --- |
| Tigolaner | 8.9 |
| Praziquantel | 7.4 |
| Emodepside | 1.85 |
| Milchsäure | 2.0 |
| BHT | 0.4 |
| Solketal | to 100.0 |

Example 7

| Ingredient | % w/w |
| --- | --- |
| Tigolaner | 9 |
| Solketal | to 100.0 |

Example 8

| Ingredient | % w/w |
|---|---|
| Tigolaner | 9.5 |
| Solketal | to 100.0 |

Example 9

| Ingredient | % w/w |
|---|---|
| Tigolaner | 9 |
| BHT | 0.1 |
| Solketal | to 100.0 |

Example 10

| Ingredient | % w/w |
|---|---|
| Tigolaner | 9.5 |
| BHT | 0.1 |
| Solketal | to 100.0 |

Example 11

| Ingredient | % w/w |
|---|---|
| Tigolaner | 9 |
| BHT | 0.2 |
| Solketal | to 100.0 |

Example 12

| Ingredient | % w/w |
|---|---|
| Tigolaner | 9.5 |
| BHT | 0.2 |
| Solketal | to 100.0 |

Example 13

| Ingredient | % w/w |
|---|---|
| Tigolaner | 9 |
| BHT | 0.4 |
| Solketal | to 100.0 |

Example 14

| Ingredient | % w/w |
|---|---|
| Tigolaner | 9.5 |
| BHT | 0.4 |
| Solketal | to 100.0 |

Example 15

| Ingredient | % w/w |
|---|---|
| Tigolaner | 9 |
| Praziquantel | 7.94 |
| Emodepside | 1.984 |
| BHT | 0.4 |
| Solketal | to 100.0 |

Example 16

| Ingredient | % w/w |
|---|---|
| Tigolaner | 9 |
| Praziquantel | 7.94 |
| Emodepside | 1.984 |
| BHT | 0.2 |
| Lactic acid | 2.0 |
| Solketal | to 100.0 |

Example 17

| Ingredient | % w/w |
|---|---|
| Tigolaner | 9 |
| Praziquantel | 7.54 |
| Emodepside | 1.885 |
| BHT | 0.2 |
| Lactic acid | 2.0 |
| Solketal | to 100.0 |

Example 118

| Ingredient | % w/w |
|---|---|
| Tigolaner | 9 |
| Praziquantel | 7.54 |
| Emodepside | 1.885 |
| BHT | 0.4 |
| Lactic acid | 2.0 |
| Solketal | to 100.0 |

Example 19

| Ingredient | % w/w |
|---|---|
| Tigolaner | 9 |
| Praziquantel | 7.54 |

-continued

| Ingredient | % w/w |
|---|---|
| Emodepside | 1.885 |
| BHT | 0.1 |
| Lactic acid | 2.0 |
| Solketal | to 100.0 |

Example 20

| Ingredient | % w/w |
|---|---|
| Tigolaner | 8.909 |
| Praziquantel | 7.409 |
| Emodepside | 1.864 |
| BHT | 0.4 |
| Lactic acid | 2.0 |
| Solketal | to 100.0 |

Example 21

| Ingredient | % w/w |
|---|---|
| Tigolaner | 9.1 |
| Praziquantel | 7.94 |
| Emodepside | 1.98 |
| BHT | 0.4 |
| Lactic acid | 2.0 |
| Solketal | to 100.0 |

Example 22

| Ingredient | % w/w |
|---|---|
| Tigolaner | 9.1 |
| Praziquantel | 7.94 |
| Emodepside | 1.98 |
| BHT | 0.2 |
| Lactic acid | 2.0 |
| Solketal | to 100.0 |

Example 23

| Ingredient | % w/w |
|---|---|
| Tigolaner | 9.1 |
| Praziquantel | 7.94 |
| Emodepside | 1.98 |
| BHT | 0.1 |
| Lactic acid | 2.0 |
| Solketal | to 100.0 |

Example 24

| Ingredient | % w/w |
|---|---|
| Tigolaner | 8.909 |
| Praziquantel | 7.409 |

-continued

| Ingredient | % w/w |
|---|---|
| Emodepside | 1.864 |
| BHT | 0.2 |
| Lactic acid | 2.0 |
| Solketal | to 100.0 |

Example 25

| Ingredient | % w/w |
|---|---|
| Tigolaner | 8.909 |
| Praziquantel | 7.409 |
| Emodepside | 1.864 |
| BHT | 0.1 |
| Lactic acid | 2.0 |
| Solketal | to 100.0 |

Biological Examples a. Summary of In-Vitro Test Results for Tigolaner as Disclosed in WO2014/122083:

Test methods and results have already been described in WO2014/122083. Results disclosed therein for Tigolaner (Ex. Ic-2 in WO2014/122083) for parasites relevant in the veterinary field are summarized below:

*Amblyomma hebraeum:* 100% efficacy at 100 ppm
*Boophilus microplus*—Dip test: 100% efficacy at 100 ppm
*Boophilus microplus*—injection test: 100% efficacy at 20 μg/tick
*Ctenocephalides felis*—oral test: 100% efficacy at 100 ppm
*Ctenocephalides felis*—contact test: 100% efficacy at 1 μg/cm$^2$
*Lucilia cuprina:* 100% efficacy at 100 ppm
*Musca domestica:* 100% efficacy at 100 ppm
*Rhipicephalus sanguineus*—contact test: 100% efficacy at 1 μg/cm$^2$
*Ixodes ricinus*—contact test 100% efficacy at 1 μg/cm$^2$
*Amblyomma hebraeum*—contact test: 100% efficacy at 1 μg/cm$^2$ B. Summary of In-Vivo Test Results for Tigolaner in Rats as Disclosed in WO2014/122083:

Test methods and results have already been described in WO2014/122083. Results for Tigolaner (Ex Ic-2 in WO2014/122083) for parasites relevant in the veterinary field are summarized below:

*Dermacentor variabilis*—systemic in vivo activity against American dog tick nymphs on rats: Efficacy of >90% against tick nymphs on day 2 at an application rate of 10 mg/kg.

*Ctenocephalides felis*—systemic in vivo activity against fleas on rats: efficacy of >95% on day 2 and of >90% on day 9 at an application rate of 10 mg/kg.

C. In-Vivo Study Endoparasites: Efficacy of a Spot-on Formulation Against Patent *Toxocara cati* and *Dipylidium caninum* Infections in Experimentally Infected Cats.

Before treatment 16 cats were experimentally infected each with *T. cati* (larvated eggs) and a feline strain of *D. caninum* (using infected *C. felis* fleas—oral and topical infestations).

On Day −1, 14 cats with patent infections of both *T. cati* and *D. caninum* were included in the study. Cats were allocated to 2 groups consisting of 7 cats each.

The spot-on Investigational Veterinary Product (IVP) was a composition according to the present invention containing 10% tigolaner, 7.94% praziquantel and 1.98% emodepside (w/v) in a solution on solketal basis. The IVP was administered to the cats in the IVP group (group 2) on Day 0 at a dose rate of 3.2 mg emodepside plus 12.7 mg praziquantel and 16 mg tigolaner/kg BW (BW=body weight), corresponding to 0.16 mL of the spot-on formulation/kg BW. Cats in group 1 served as the negative control group. On Day 10 the cats were subjected to euthanasia and gastrointestinal helminths were recovered during necropsy. Worms were identified and counted. Efficacy calculations were based on the number of worms recovered at necropsy in the IVP group, compared to the negative control group. The following formula was used:

Efficacy (%)=100×(*Mc*−*Mt*)/*Mc*, where

Mc=Geometric mean number of worms/scoleces in the negative control group (group 1)

Mt=Geometric mean number of worms/scoleces in the IVP group (group 2)

All cats in the control group contained *T. cati* worms, whilst 5 cats contained *D. caninum* scoleces. An efficacy of 100% was obtained in IVP group against both *T. cati* and *D. caninum*.

No Adverse Events (AEs) occurred.

D. In-Vivo Study Ectoparasites: Efficacy of a Spot-On Formulation Against Experimental Ticks and Flea Infestations in Cats.

On SD −4 twelve cats were included in the study. On SD −1, cats were experimentally infested with *Ixodes ricinus* ticks, which were counted without removal on SD 0 (for group allocation) and were removed and counted on SD 2 (treatment efficacy). On SD 0, six cats were treated with the IW applied once as a spot-on at a dosage of 14 mg tigolaner+3 mg emodepside+12 mg praziquantel per kg bodyweight. Six cats served as untreated controls.

The IVP contained 10% (m/V) Tigolaner, 8.58% (m/V) Praziquantel and 2.14% (m/V) emodepside in a solution on solketal basis.

Cats were experimentally infested with ticks and fleas fortnightly. Efficacy of the IW was determined by comparison of tick and flea counts of the treatment group versus the control group. General health was observed daily.

TABLE 1

Study design

| Group | No. of cats | Treatment and dosage | Day of treatment | Days of infestations and counts *I. ricinus* ticks* | *C. felis* fleas** |
|---|---|---|---|---|---|
| 1 | 6 | IVP [14 mg Tigolaner + 3 mg emo- depside + 12 mg pra- ziquantel] | 0 | Infestations: SDs −1, 16, 29, 43, 57, 72, 85 Counts (48 h): | Infestations: SDs 1, 15, 42, 56, 71, 78 Counts: SDs 2, 16, 29, 43, 57, 72, 85 |
| 2 | 6 | n/a | n/a | SDs 0, 2, 18, 31, 45, 59, 74, 87 | |

*Each cat was infested with 20 female and 20 male *Ixodes ricinus* ticks.
**Each cat was infested with 100 *C. felis*

TABLE 2

Efficacy against fleas and ticks based on arithmetic means

| Efficacy against fleas | | | | | | |
|---|---|---|---|---|---|---|
| SD 2 | SD 16 | SD 29 | SD 43 | SD 57 | SD 72 | SD 85 |
| 100.00 | 99.09 | 100.00 | 100.00 | 100.00 | 100.00 | 99.59 |

| Efficacy against ticks | | | | | | |
|---|---|---|---|---|---|---|
| SD 2 | SD 18 | SD 31 | SD 45 | SD 59 | SD 74 | SD 87 |
| 100.00 | 100.00 | 100.00 | 97.60 | 100.00 | 100.00 | 100.00 |

Efficacy (≥99%) against fleas could be claimed on all study days up to SD 85.

Therapeutic efficacy (≥90%) against ticks could be claimed on SD 2 and preventive efficacy against ticks could be claimed up to SD 87.

The IVP was very well tolerated in cats upon single topical treatment. There were no adverse events related to IVP-treatment during this study.

The invention claimed is:

1. A pharmaceutical composition for treating and/or preventing parasite infections, wherein the composition comprises, based on a total weight of the composition:
   tigolaner, wherein the tigolaner is present in an amount of 7-11 wt. %;
   praziquantel, wherein the praziquantel is present in an amount of 6-9 wt. %;
   emodepside wherein the emodepside is present in an amount of 1.2-3 wt. %;
   a solvent component, wherein the solvent component comprises 1,2-isopropylideneglycerol;
   an anti-oxidant, wherein the anti-oxidant is butyl hydroxyanisole (BHA) and/or butyl hydroxytoluene (BHT); and
   an acid, wherein the acid is lactic acid.

2. The composition according to claim 1, comprising:
   ≥0.01 weight-% to ≤1 weight-% butyl hydroxyanisole (BHA) and/or butyl hydroxytoluene (BHT);
   ≥1 weight-% to ≤5 weight-% lactic acid;
   wherein the weight-percentages are based on the total weight of the composition and add up to ≤100 weight-%.

3. A method for producing a composition according to claim 1, comprising:
   dissolving the praziquantel, the emodepside and the tigolaner in the solvent component; and
   producing the pharmaceutical composition.

4. The composition according to claim 1,
wherein the water content of the composition is at most 5% by weight.

5. The composition according to claim 4,
wherein the solvent component comprises only 1,2-isopropylideneglycerol.

6. The pharmaceutical composition according to claim 1, wherein the pharmaceutical composition is used for treating and/or preventing parasite infections in one or more animals, wherein the one or more animals are cats or dogs.

7. The pharmaceutical composition according to claim 1, wherein the parasitic infections are caused by parasites, and wherein the parasites are endoparasites and ectoparasites.

8. The pharmaceutical composition according to claim 6, wherein the parasitic infections are caused by parasites, and wherein the parasites are endoparasites and ectoparasites.

9. The pharmaceutical composition according to claim 7, wherein the parasites are selected from the group consisting of:
endoparasites selected from: *Toxocara cati*, *Toxascaris leonina*, *Ancylostoma tubaeforme*, *Uncinaria stenocephala*, *Dipylidium caninum*, *Taenia taeniaeformis*, *Echinococcus multiocularis*, *Aelurostrongylus abstrusus*, and *Troglostrongylus* spp.; Ectoparasites selected from: *Ctenocephalides* spp., *Echidnophaga* spp., *Cteratophyllus* spp., *Pulex* spp., *Hyalomma* spp., *Rhipicephalus* spp., *Boophilus* spp., *Amblyomma* spp., *Haemaphysalis* spp., *Dermacentor* spp., *Ixodes* spp., *Argas* spp., *Ornithodorus* spp., *Otobius* spp., *Otodectes cynotis*, *Notoedres cati*, and combinations thereof.

10. The pharmaceutical composition according to claim 8, wherein the parasites are selected from the group consisting of:
endoparasites selected from: *Toxocara cati*, *Toxascaris leonina*, *Ancylostoma tubaeforme*, *Uncinaria stenocephala*, *Dipylidium caninum*, *Taenia taeniaeformis*, *Echinococcus multiocularis*, *Aelurostrongylus abstrusus*, and *Troglostrongylus* spp.; Ectoparasites selected from: *Ctenocephalides* spp., *Echidnophaga* spp., *Cteratophyllus* spp., *Pulex* spp., *Hyalomma* spp., *Rhipicephalus* spp., *Boophilus* spp., *Amblyomma* spp., *Haemaphysalis* spp., *Dermacentor* spp., *Ixodes* spp., *Argas* spp., *Ornithodorus* spp., *Otobius* spp., *Otodectes cynotis*, *Notoedres cati*, and combinations thereof.

\* \* \* \* \*